United States Patent [19]
Schuyler

[11] Patent Number: 5,220,156
[45] Date of Patent: Jun. 15, 1993

[54] STABLE CONTROL SYSTEM WITH POSITIVE FEEDBACK CHARACTERISTIC

[75] Inventor: Martin Schuyler, Hastings-on-Hudson, N.Y.

[73] Assignee: Cox & Company, Inc., New York, N.Y.

[21] Appl. No.: 734,496

[22] Filed: Jul. 23, 1991

[51] Int. Cl.$^5$ .............................................. H05B 1/02
[52] U.S. Cl. .................................. 219/497; 219/501
[58] Field of Search ............... 219/497, 491, 501, 492

[56] References Cited

U.S. PATENT DOCUMENTS

| | | | |
|---|---|---|---|
| 3,197,616 | 7/1965 | Gade | 219/497 |
| 3,566,151 | 2/1971 | Wilburn | 307/117 |
| 3,710,077 | 1/1973 | Hubert | 219/492 |
| 3,805,539 | 4/1974 | Burgel | 62/148 |
| 3,831,003 | 8/1974 | Foerster | 219/499 |
| 4,013,872 | 3/1977 | Glass | 219/497 |
| 4,146,775 | 3/1979 | Kirchner | 219/295 |
| 4,182,183 | 1/1980 | Funk | 73/362 AR |
| 4,210,823 | 7/1980 | Kabat | 307/117 |
| 4,236,064 | 11/1980 | Aiba | 219/497 |
| 4,339,649 | 7/1982 | Hronchek | 219/10.55 B |
| 4,374,321 | 2/1983 | Cunningham | 219/497 |
| 4,418,375 | 11/1983 | Ober | 361/253 |
| 4,426,572 | 1/1984 | Tachikawa | 219/497 |
| 4,467,182 | 8/1984 | Merkel | 219/497 |
| 4,493,984 | 1/1985 | Yamauchi | 219/501 |
| 4,506,127 | 3/1985 | Satoh | 219/10.55 B |
| 4,507,546 | 3/1985 | Fortune | 219/497 |
| 4,590,362 | 5/1986 | Ishima | 219/497 |
| 4,623,222 | 11/1986 | Itoh | 350/331 T |
| 4,777,350 | 10/1988 | Crockett | 219/497 |
| 4,888,471 | 12/1989 | Thorax | 219/510 |

*Primary Examiner*—Teresa J. Walberg
*Attorney, Agent, or Firm*—Mark H. Jay

[57] ABSTRACT

A control system and circuit has a positive feedback characteristic but is nonetheless stable. Stability is achieved by superimposing a negative feedback loop with a short time constant and a positive feedback loop with a long time constant. The system and circuit are useful in situations where the sensor and the controlled variable (e.g. a heater) are well-coupled.

6 Claims, 6 Drawing Sheets

STABLE CONTROL SYSTEM WITH POSITIVE FEEDBACK CHARACTERISTIC

BACKGROUND OF THE INVENTION

The invention systems, and more particularly relates to proportional control systems. In its most immediate sense, the invention relates to proportional control systems wherein the sensor is well-coupled to the controlled variable.

In a thermostatic control system such as is used in many applications, a sensor turns e.g. a heater on when the sensor temperature is below the desired control temperature and turns the heater off when the sensor temperature rises above the desired temperature. An example of this type of system is a conventional electrical water heater.

It has long been known that such a thermostatic control system does not use energy efficiently. This is because the control temperature must as a practical matter be set higher than the desired temperature and energy is used to overshoot the desired temperature.

Therefore, in applications where energy efficiency is important, such as in heating equipment on an aircraft (where power resources are limited) proportional control systems have been used. In these, a proportioning band is established and the duty cycle of the heater is varied between 100% (full on) at the bottom of the band and 0% (full off) at the top of the band. This sort of control system regulates the temperature much more closely than does a thermostatic control system and consequently requires less power from the airplane.

In both sorts of systems, the sensor (e.g. the thermostat or thermistor) is poorly coupled to the heater. In practice, this usually means that the sensor is located far away from the heater, so that the sensor responds not to the temperature of the heater, but rather to the temperature of the heated material (e.g. water, windshield, breeze surface).

However, there are applications where it is impossible or highly difficult to space the sensor and heater far apart. For example, commercial aircraft have water lines which supply water to the lavatories and galleys. These lines may be exposed to ambient temperatures of −30° F. and less. It is therefore necessary to heat the lines to prevent them from freezing up.

One of the best ways in which to do this is to insert (as through a tee fitting) a heating element into the water line. In such an application, it is sometimes impractical (because of space or other constraints) to use a separate sensor which is spaced from the heating element. In such an application, if a sensor is to be used at all, it must be placed immediately adjacent the heating element.

If such a heater is to be driven by a conventional proportional control circuit, the system will not operate properly. When the heater is off and the water temperature drops below 32° F., the sensor will call for heat and the heater will turn on. This will immediately raise the temperature of the sensor above 32° F. (without heating the water very much) and the sensor will call to turn the heater off. Then, the sensor will immediately cool down, will immediately call for heat, and the system will cycle on and off without heating the water. The water will therefore freeze.

It would be advantageous to provide a proportional control system which would operate properly even when the sensor is well-coupled to the heater.

One object of the invention is to provide a control circuit and system which permits proportional control of e.g. a heater even when the sensor which governs the operation of the heater is well-coupled to the heater.

Another object is, in general, to improve on known circuits and systems of this general type.

The invention proceeds from a realization that a proportional control circuit used in an application such as has been described above should ideally have a proportioning operation in which the duty cycle of the heater should increase with increasing sensor temperature instead of decreasing with increasing sensor temperature as is the case in known proportional controllers.

However, such an operation would seem to be completely impractical because it calls for positive feedback. Conventional analysis would rule such positive feedback out because it is unstable. As an example, if the heater turned on, the sensor would call for more heat. This would increase the temperature of the heater, increase the temperature of the sensor, and would keep on until the whole system burned out.

In accordance with the invention, a negative feedback loop and a positive feedback loop are superposed. The time constant of the negative feedback loop is less than the time constant of the positive feedback loop. As a result, the negative feedback characteristics predominate at all times and the system is therefore stable even though it has positive feedback characteristics.

BRIEF DESCRIPTION OF THE DRAWINGS

The invention will be better understood with reference to the following illustrative and non-limiting drawings, in which.

DETAILED DESCRIPTION OF A PREFERRED EMBODIMENT

Figure 1:
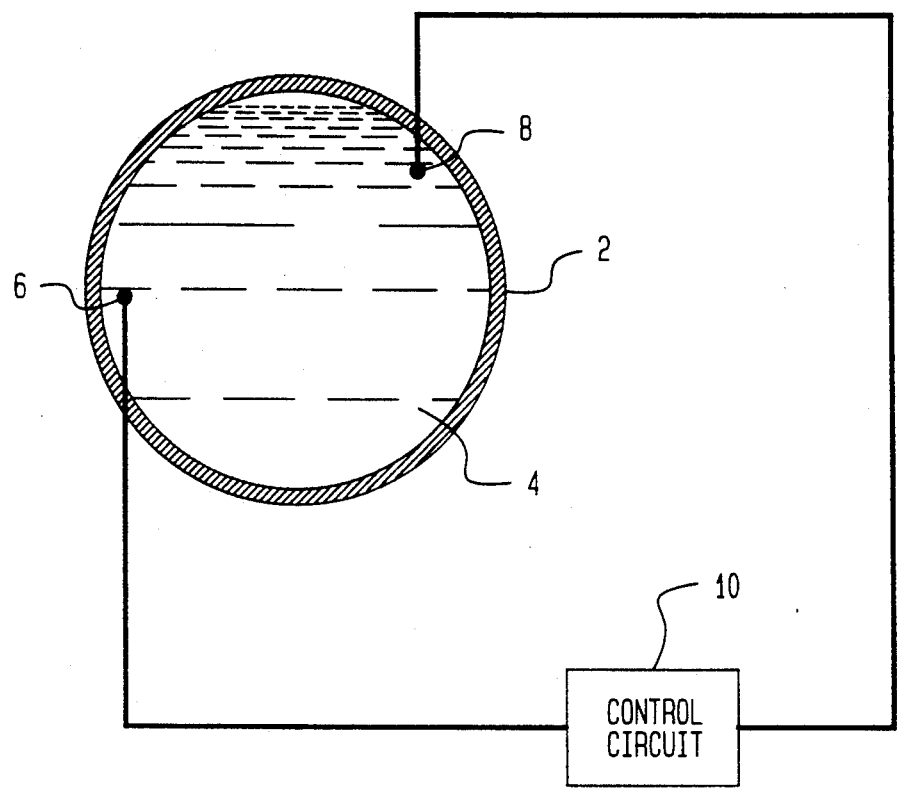
FIG. 1 schematically illustrates a heating system wherein the sensor and the heater are poorly coupled.
Figure 2:
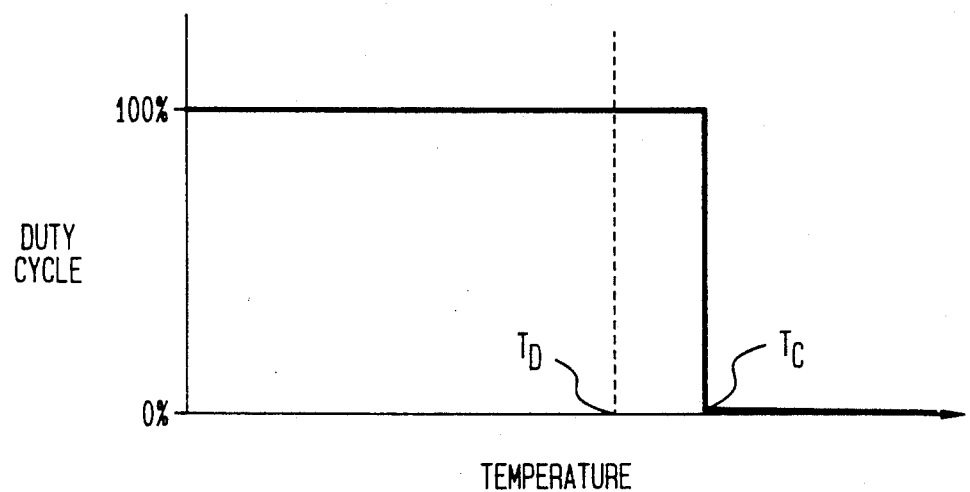
FIG. 2 schematically illustrates a conventional transfer function of a thermostatic control circuit for the system of FIG. 1.

In FIG. 1, a water vessel 2 contains water 4 which is heated by a heater 6. The temperature of the water 4 is detected by a sensor 8, which may be a thermostat or a sensor as is described below. A control circuit 10 connects the sensor 8 and the heater 6 and turns the heater 6 on and off.

Where the sensor 8 is a thermostat and the control circuit 10 is adapted for thermostatic control, the heater 6 is turned full on when the temperature of the water 4 is below some predetermined control temperature $T_C$ and is turned completely off when the temperature of the water 4 rises above $T_C$. This is shown (in an exemplary manner, and not to scale) in FIG. 2.

This sort of operation is well-known. It is not energy-efficient because the control temperature $T_C$ must be set somewhat higher than the desired temperature $T_D$ and energy is wasted whenever the temperature of the water 4 exceeds $T_D$ and the heater 6 remains on. For a heater designed to prevent water freeze-up, a typical $T_D$ would be 33° F. and a typical $T_C$ would be 4° F. In practice, the difference between $T_D$ and $T_C$ would be determined by the time constant of the system (which is affected by, e.g. the mass of the water 4 to be heated, the power produced by the heater 6, the insulation of the water vessel 2, etc.)

Figure 3:
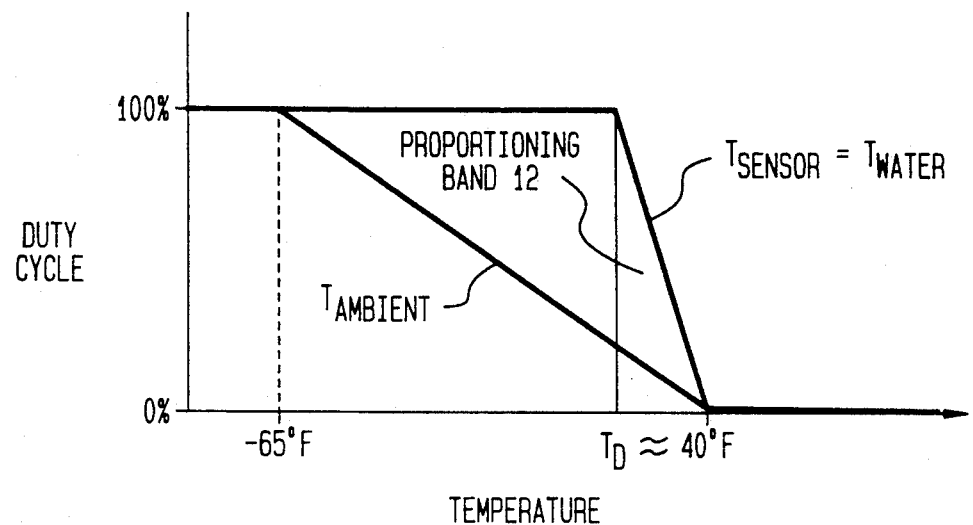
FIG. 3 schematically illustrates a conventional transfer function of a proportional control circuit for the system of FIG. 1.

For applications requiring more efficient use of energy or more precise control, such as for heating equipment on an aircraft, the sensor 8 may be a proportional sensor (such as a thermistor) and the control circuit 10 may be a proportional controller. In such a case, which is illustrated (in an exemplary manner, and not to scale) in FIG. 3, a proportioning band 12 is established. Within the proportioning band 12, the duty cycle of the heater 6 is varied linearly between 100% (full on) and 0% (full off). (It will be appreciated that absolute linearity is not necessary and that nonlinear proportioning can be implemented if desired.) With such a system, the setpoint temperature $T_D$ may be set at or close to the top of the proportioning band and overshoots above $T_D$ consume little if any power.

Let it now be assumed (see FIG. 4) that a very small water line 2' contains water 4' which is to be heated by a heater 6' which is immediately adjacent (and therefore well-coupled to) a sensor 8'. (For the purposes of this discussion, it does not matter whether sensor 8' is a thermostat or a proportional sensor.) The sensor 8' is connected to the heater 4' by a conventional control circuit 10' (which may likewise be thermostatic or proportional.)

When the temperature of the water 4' drops below $T_C$, the sensor 8' will call for heat and the circuit 10' will turn the heater 6' on. The heat output of the heater 6' will immediately raise the temperature of the sensor 8' since both are well coupled. (It will be understood that in this description, "well coupled" means that the thermal coupling between the heater 6' and the sensor 8' is better than the thermal coupling between the heater 6' and the water 4'. There is always some coupling between every heater and every sensor in this sort of system, but this example is designed to illustrate what happens when the predominant coupling is between the heater and sensor rather than between the heater and the water.) The sensor 8' will then report that no more heat is needed and the circuit 10' will shut the heater 6' off. The temperature of the sensor 8' will then drop, the sensor 8' will call for heat once again, and the system will cycle on and off without substantially heating the water 4'.

Since conventional control circuits will not work in this particular application, it is necessary to examine the thermodynamics of this application in order to design a circuit which will operate properly. These thermodynamics are illustrated in FIG. 5, which is not to scale and is only for purposes of illustration.

Figure 5:
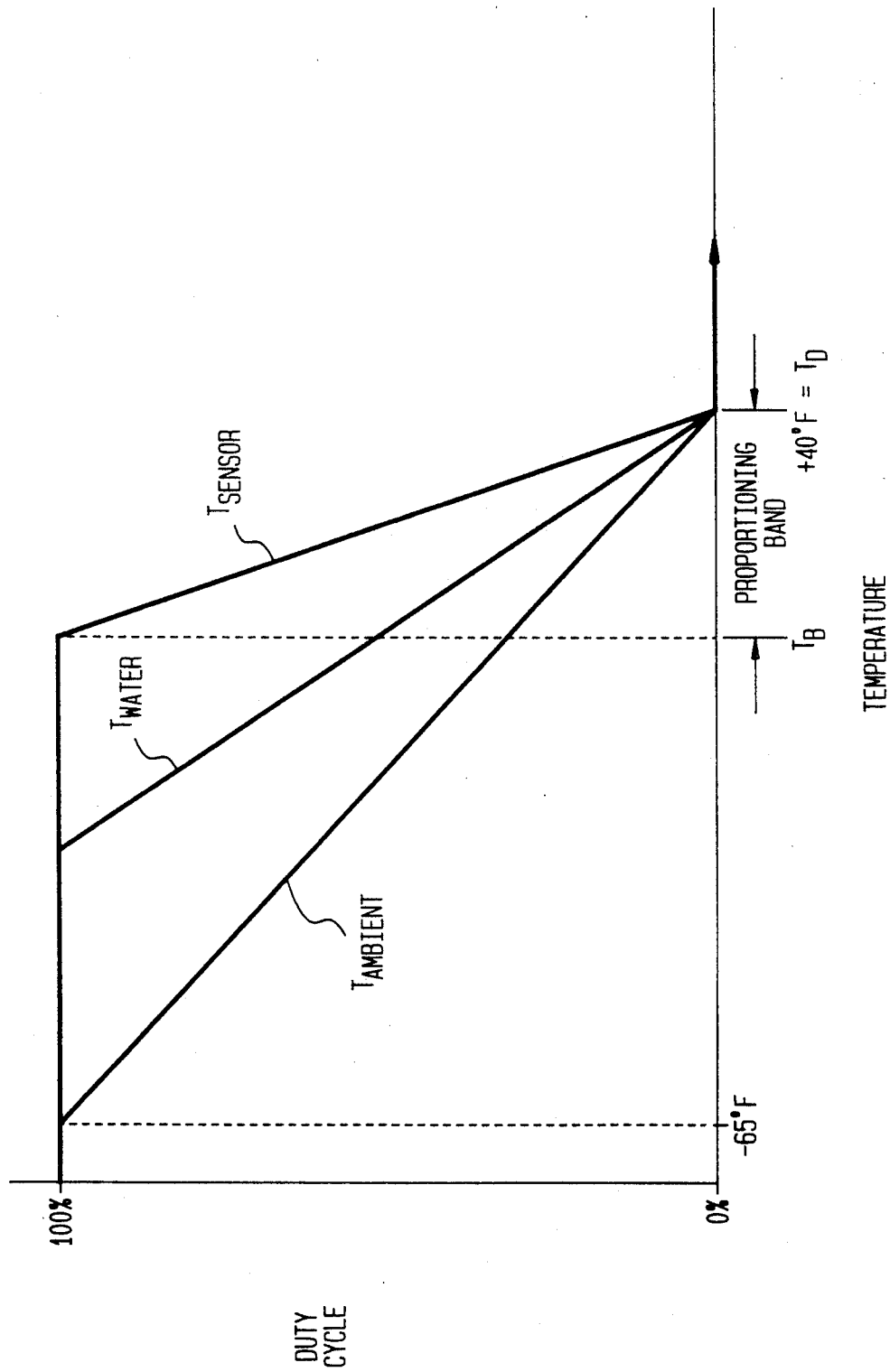
FIG. 5 schematically depicts the relationships between the temperatures of the various parts of the FIG. 4 system when the FIG. 4 system is being heated by an appropriate heater.

It must be initially understood that FIG. 5 assumes that the water 4' is heated properly. Where the temperature of the sensor 8' is at or below $T_B$, the bottom of the proportioning band 12', there will be a substantial difference between the temperature of the sensor 8' and the temperature of the water 4' because the heat transfer between the heater 6' and the sensor 8' is assumed to be more efficient than the heat transfer between the heater 6' and the water 4'. However, as the temperature of the sensor 8' increases above $T_B$, the difference between the temperature of the sensor 8' and the temperature of the water 4' will decrease. This is because less heat is needed to raise the temperature of the water 4' to its desired value, and less heat is therefore produced to heat the sensor 8'. This continues to the extreme case, wherein the ambient temperature reaches the desired setpoint temperature $T_D$ (perhaps 40° F.) and the temperatures of the sensor 8' and the water 4' are identical (so that the difference between them is zero). This shows that where the sensor 8' and heater 6' are well coupled, the temperature of the controlled variable (in this case, the water 4') changes substantially with changes in the ambient temperature.

Figure 6:
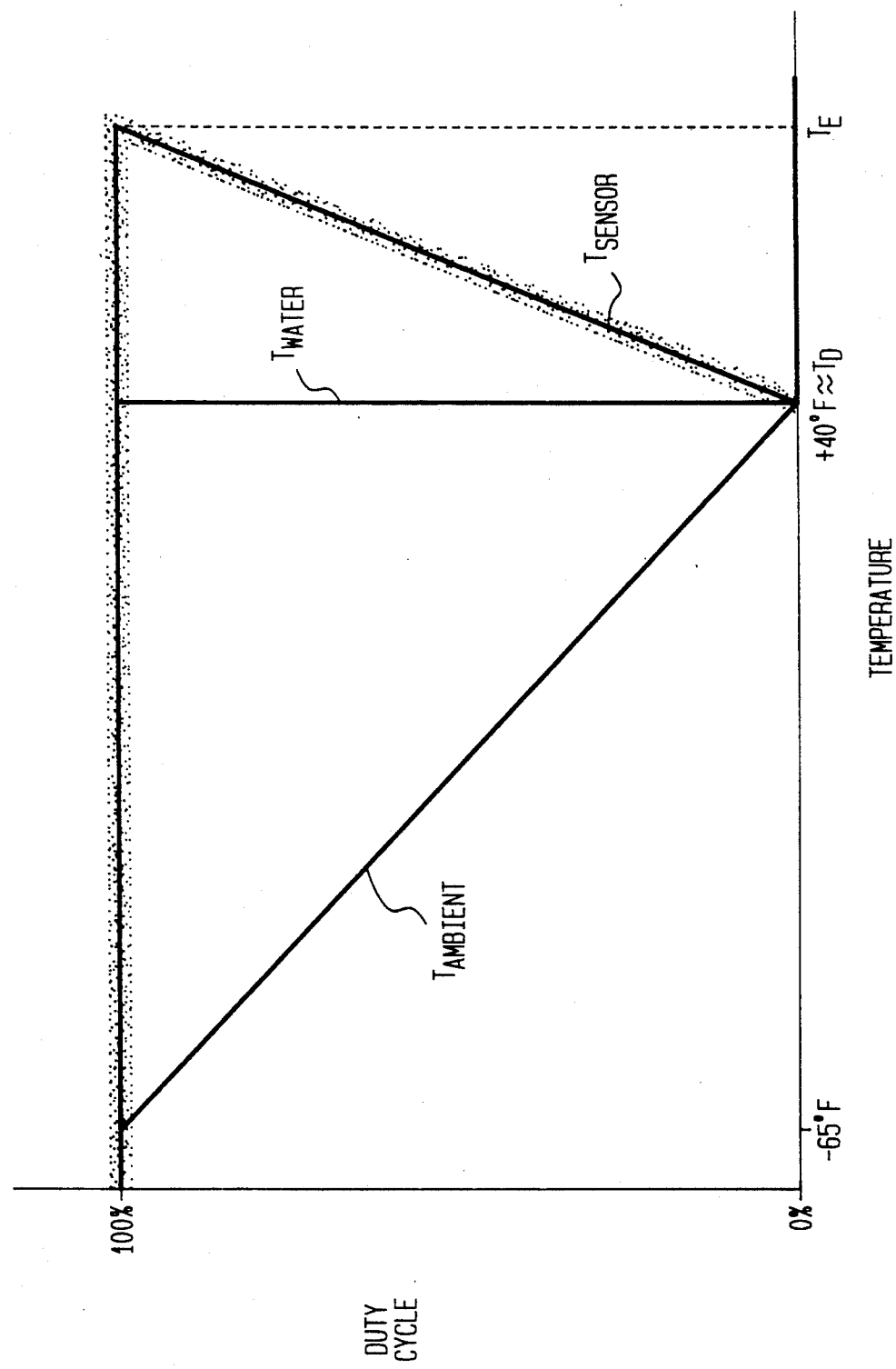
FIG. 6 schematically illustrates a transfer function which would efficiently heat the FIG. 4 system using proportional control.

It therefore follows, paradoxically, that to properly heat the water 4' where the sensor 8' and the heater 6' are well coupled, it is necessary to have a transfer function such as that which is illustrated, schematically and not to scale, in FIG. 6. Here, where the temperature of the sensor 8' is below $T_D$, the heater 4' will be full on (100% duty cycle). Where the temperature of the sensor 8' rises above $T_D$, the system "realizes" that the heater 4' is heating the sensor 8' and the water 4', that the sensor 8' is warmer than the water 4', and that more heat from the heater 6' is needed to equalize the temperatures of the water 4' and the sensor 8'.

Figure 4:
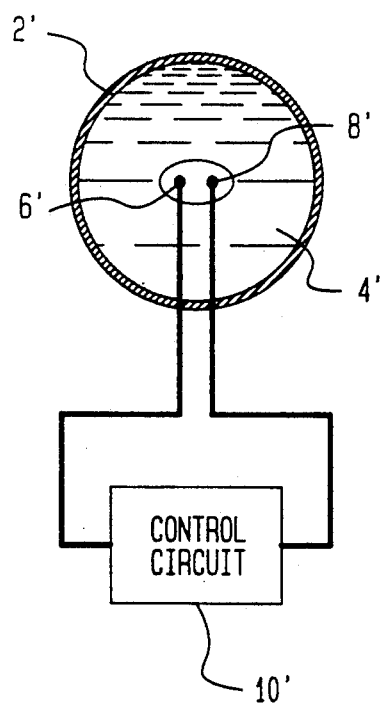
FIG. 4 schematically illustrates a heating system wherein the sensor and the heater are well coupled.

A conventional analysis of the transfer function illustrated in FIG. 6 will result in the conclusion that the FIG. 4 system cannot be stable. This is because the FIG. 6 transfer function utilizes positive feedback above the desired setpoint temperature $T_D$. Therefore, as temperature of the sensor 8' were to rise above $T_D$, more power would be delivered to heater 6', the temperature of the sensor 8' would continue to increase, and this would continue until the system reached saturation.

However, in accordance with the invention, a transfer function having the shape of FIG. 6 is created by superposing two different feedback loops. One of these has conventional negative feedback, and the other has positive feedback. The negative feedback loop has a shorter (advantageously a much shorter) time constant than does the positive feedback loop.

As will be explained below, because the negative feedback loop as a shorter time constant, negative feedback dominates the response of the system at any particular time. This makes the system stable. However, over the long term, the positive feedback loop causes a shift in the overall operating point cf the system. The slope of the overall transfer function desired is created by choosing appropriate gains for the loops, without affecting the stability of the system (which is a function of the time constants).

Figure 7:
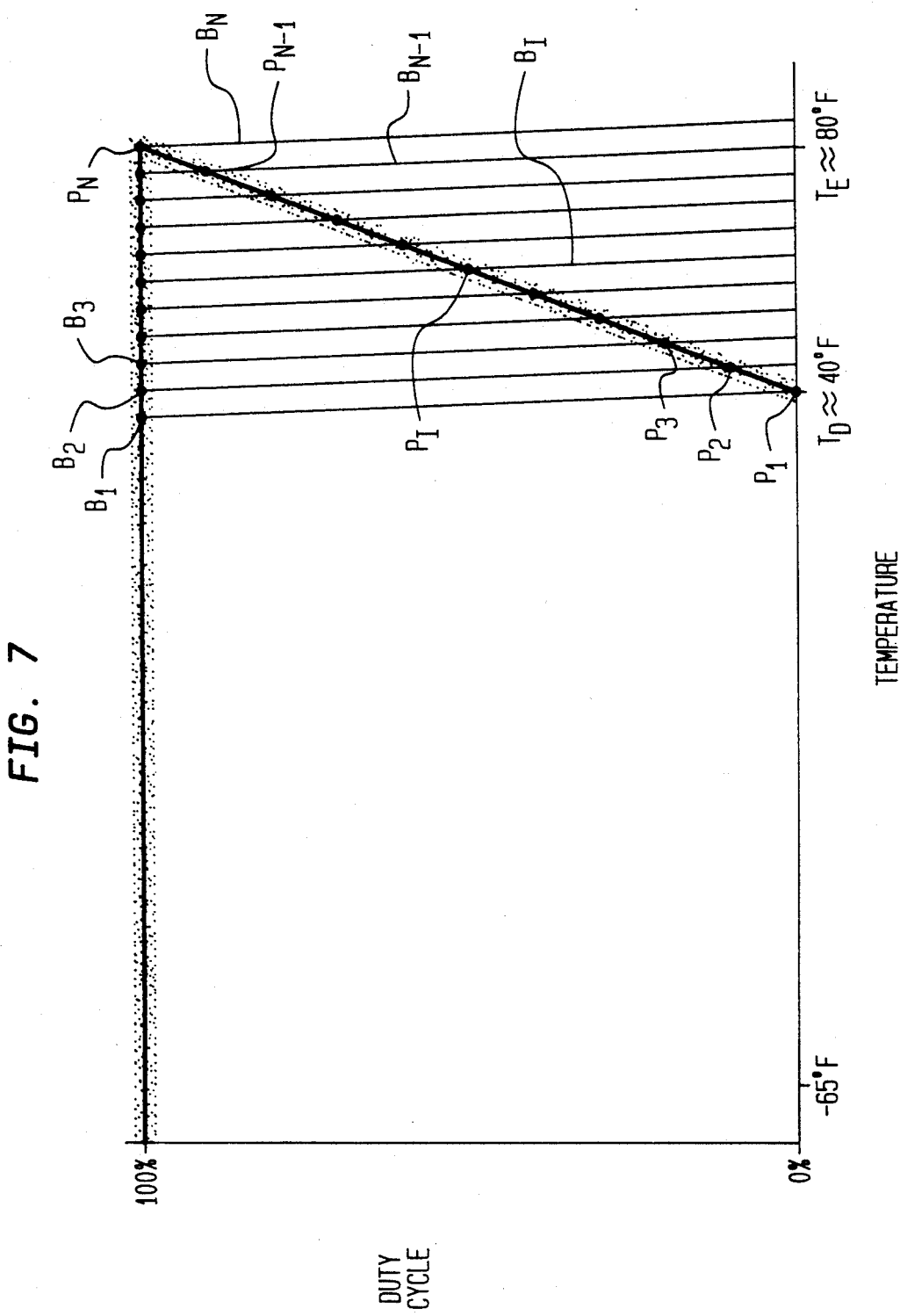
FIG. 7 is a slightly inaccurate model which is useful in conceptualizing the operation of the preferred embodiment of the invention.

FIG. 7 illustrates how a system which utilizes positive feedback can be stable. Let it be assumed that instead of having one proportioning band as is conventional in the proportional controller art, there are many such bands $B_1, B_2, \ldots B_N$) one adjacent the next and covering the range of operation of the control circuit 10' between $T_D$ and the extreme temperature $T_E$. Each band $B_1, B_2$ etc. is so thin that it may be treated as a line. Let it also be assumed that an individual band is selected from the entire group of bands based upon the long-term average power $P_1, P_2, \ldots P_N$) delivered by the heater 6' (i.e. based upon the long-term average duty cycle of the heater 6'). Let it further be assumed that the average duty cycles are calculated so that $P_2 > P_1$, $P_3 > P_2$ etc., and that the time constant within each of the bands $B_1$, $B_2$ etc. is much less than the time constant required to change from one band to an adjacent band. Because the desired setpoint temperature $T_D$ is at the top of the first band $B_1$, $P_1$ is zero (corresponding to a 0% duty cycle) and therefore lies on the 0% duty cycle line. Similarly, because the extreme temperature $T_E$ is at the bottom of the last band $B_N$, $P_N$ is at a maximum (corresponding to a 100% duty cycle) and lies on the 100% duty cycle line.

When the device is turned on, the sensor 8' will be at some arbitrary temperature below the setpoint $T_D$. The heater 6' will run at a 100% duty cycle and the sensor 8' will gradually warm up until it reaches the extreme temperature $T_E$ (so that the circuit 10' will be operating in the top band $B_N$). Because the top band of operation is a negative feedback loop with a short time constant, any further rise in temperature will cause a quick decrease in the duty cycle of the heater 6'. This will cause the temperature to diminish, which will raise the duty cycle of the heater 6' to increase, and so on. Consequently, the system will rapidly reach a short-term equilibrium at some point near $P_N$ along the band $B_N$.

However, the band $B_N$ corresponds to a long-term duty cycle of 100% (note that $P_N$ lies on the 100% duty cycle line). Since the average duty cycle is below 100%, after a relatively long time (which is a function of the long time required to shift from one band to the next) the circuit 10' will begin to operate in band $B_{N-1}$ (the next band to the left), and will rapidly reach a short term-equilibrium at some point near point $P_{N-1}$ along band $B_{N-1}$. This shifting from a higher-power band to the next lower-power band will continue until the system is operating in a band $B_I$ which is consistent with the long-term average power which the ambient conditions require. Each time there is a shift from a higher-power band to a lower-power band, there is a rapid, and quickly damped, oscillation about the next-lower point P.

The band $B_I$ is selected by the circuit 10' based only on the long term average power of heater 6' that is required to meet ambient conditions, with band $B_1$ selected for 0% power, band $B_N$ selected for 100% power, and intermediate bands based on a linear power relationship.

Thus, the superposition of the two feedback loops gives a stable system which nonetheless has the positive feedback characteristic which connects all the points $P_1, P_2 \ldots P_N$. Stability is maintained because the positive feedback characteristic changes much more slowly than does the negative feedback characteristic, but positive feedback is nonetheless achieved.

Figure 8:
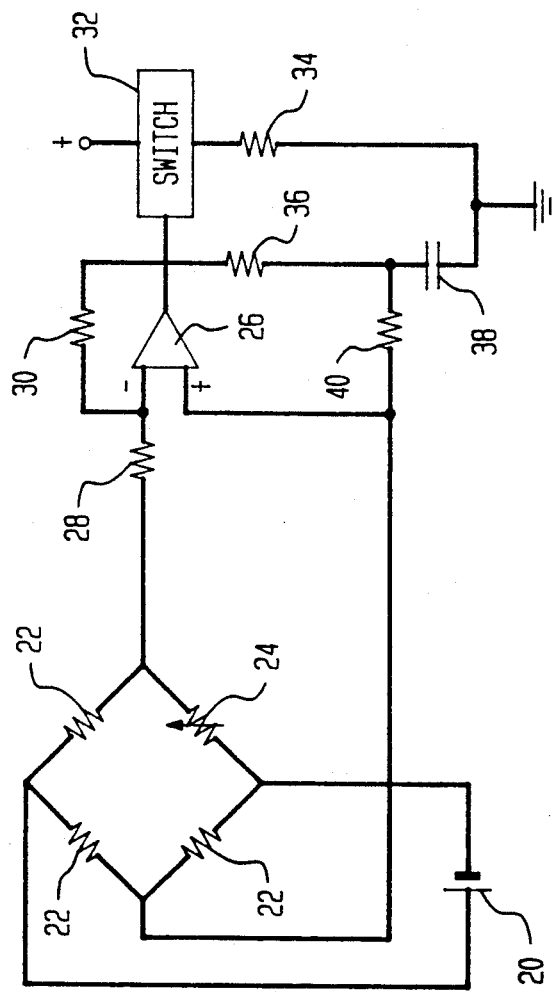
FIG. 8 is an electrical schematic diagram of a preferred embodiment of the invention.

The preferred embodiment of the circuit 10', sensor 8' and heater 6' described below in connection with FIG. 8 is entirely analog in operation so that there are no bands; right and left movement is continuous rather than discrete. However, the above-described principles are fully applicable to the preferred embodiment as is described below; the preferred embodiment has two feedback loops, one with a negative characteristic and a short time constant and the other with a positive characteristic and a long time constant. The overall transfer function of the preferred embodiment is a superposition of the characteristics of the two feedback loops.

Figure 9:
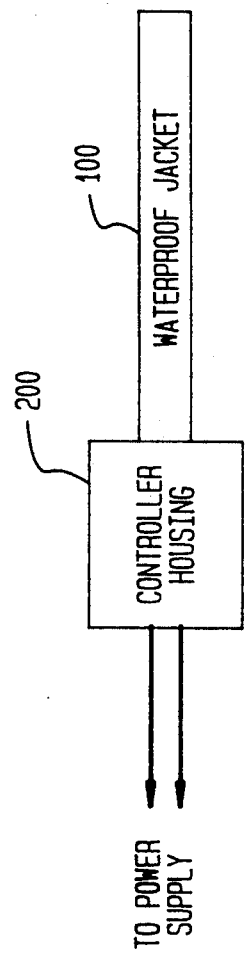
FIG. 9 is a mechanical schematic diagram of the preferred embodiment of the invention.

Turning now to FIG. 8, a DC power source 20 supplies a resistance bridge having resistors 22 and a PTC thermistor 24. (The thermistor 24 may be a wire of an alloy sold under the BALCO trademark, or may alternatively be of nickel. While in this example the thermistor 24 is a PTC device, an NTC device could easily be accommodated; this is not a part of the invention.) The output of the bridge formed by resistors 22 and thermistor 24 is connected between the inverting input and the non-inverting input of an operational amplifier 26; the connection is accomplished directly in the case of the non-inverting input and through resistor 28 in the case of the inverting input. The output of the operational amplifier 26 is connected to the inverting input through a resistor 30 and to the control terminal of a power switch 32. The power switch 32 supplies the hot side of a grounded heater 34. (The power supply to operational amplifier 26 is omitted for clarity.) The heater 34 and thermistor 24 are placed together within a thin (e.g. 0.200" diameter) waterproof jacket 100 (see FIG. 9) and the circuit components are located within a controller housing 200 at the proximal end of the jacket 100. This sort of arrangement is known and has long been used by Cox & Company in its INNERLINE water heaters.

Because the thermistor 24 is of the PTC type, an increase in temperature of the thermistor 24 causes an increase in the voltage at the inverting input of the operational amplifier 26 and a corresponding decrease in voltage at the output of the operational amplifier 26. This diminishes the power delivered to the heater 34 by the power switch 32. Thus, the heater 34 and the thermistor 24 are connected to form a negative feedback loop. (The gain of this negative feedback loop is established by the ratio of resistors 30 and 28.) The time constant of this loop is quite short because the heater 34 and the thermistor 24 are thermally well-coupled. The resistors 22 and thermistor 24 are chosen so that below $T_D$ of about 40° F., the voltage at the output of the operational amplifier 26 is at a maximum.

A resistor 36 and a capacitor 38 form a series RC network. The resistor 36 is connected between the output of the operational amplifier 26 and the capacitor 38 and the capacitor 38 is connected between the resistor 36 and ground. Because the voltage across a capacitor is related to the time integral of the current flowing through it, the voltage across the capacitor 38 is a function of the average power through the heater 34. This voltage is impressed upon the non-inverting input of the operational amplifier 26 through resistor 40.

Because the high side of the capacitor 38 is connected to the non-inverting input of the operational amplifier 26, a positive feedback loop is formed. The time constant of this feedback loop is determined by resistor 36 and capacitor 38 and is chosen to be long relative to the time constant of the negative feedback loop which exists between the heater 34 and the thermistor 24.

Consequently, the voltage at the output of the operational amplifier 26, and therefore the average power delivered to the heater 34 by the power switch 32, is determined by the superposition of two feedback loops. One of these loops is a negative feedback loop with a short time constant, and the other is a positive feedback loop with a long time constant. The ratio of the effects of these two feedback loops, and consequently the slope of the net sum of the two, is determined by resistor 40 and the bridge resistors 22.

In the embodiment illustrated, the operational amplifier 26 is a high-gain unit. Consequently, at all temperatures below $T_D$ (approximately 40° F.) and above $T_E$ (approximately 80° F.) the circuit is saturated and delivers maximum power. The proportioning operation described above takes place only in a relatively narrow temperature band. Exemplary values of the stated components are as follows:

Resistor 28 —20 KΩ
Resistor 30 —5 MΩ
Resistor 36 —2.5 MΩ
Capacitor 38 —180 μf
Resistor 40 —2.5 MΩ

In the preferred embodiment, the relationship between $T_D$ and $T_E$ is established by running the heater at full power and measuring the difference in temperature between the water and the sensor. Then, $T_E$ is set so that this difference equals the difference be $T_D$ and $T_E$.

Although a preferred embodiment has been described above, the scope of the invention is limited only by the following claims:

I claim:

1. A stable control circuit, comprising:
    an input;
    an output;
    a negative feedback loop connecting the input and output and having a first time constant; and
    a positive feedback loop connecting the input and output and having a second time constant, the second time constant being longer than the first time constant.

2. A control system for regulating a load in accordance with the electrical characteristics of a sensor which is well-coupled to the load, comprising:
    an input to which a sensor is connected;
    an output to which a load is connected;
    a negative feedback loop connecting the input and output and having a first time constant; and
    a positive feedback loop connecting the input and output and having a second time constant, the second time constant being longer than the first time constant.

3. An improvement to a negative feedback control system which regulates a load in accordance with the electrical characteristics of a sensor using a negative feedback loop with a fixed time constant, the improvement compensating the system for coupling between the sensor and load and comprising a positive feedback loop having a time constant which is longer than the time constant of the negative feedback loop.

4. A proportional control circuit comprising:
    a temperature-sensing network having an output voltage which varies with temperature;
    an operational amplifier having an output and inverting and non-inverting inputs, said network being connected between said inverting and non-inverting inputs;
    an electrical heater connected between said output and ground; and
    a positive feedback loop connecting said output and said non-inverting input.

5. The circuit of claim 4, wherein the positive feedback loop directs, to the non-inverting input, a voltage which is proportional to average power through the heater.

6. The circuit of claim 5, wherein the positive feedback loop comprises:
    a series RC circuit connected in parallel with the heater and having a first resistor which is connected to said output and a capacitor which is connected to ground, the first resistor being connected to the capacitor at a junction; and
    a second resistor connected between said junction and said non-inverting input.

* * * * *